US011836518B2

(12) United States Patent
Simpson

(10) Patent No.: US 11,836,518 B2
(45) Date of Patent: Dec. 5, 2023

(54) PROCESSOR GRAPH EXECUTION USING INTERRUPT CONSERVATION

(71) Applicant: Wave Computing, Inc., San Jose, CA (US)

(72) Inventor: David John Simpson, San Jose, CA (US)

(*) Notice: Subject to any disclaimer, the term of this patent is extended or adjusted under 35 U.S.C. 154(b) by 137 days.

(21) Appl. No.: 17/548,463

(22) Filed: Dec. 10, 2021

(65) Prior Publication Data

US 2022/0197692 A1 Jun. 23, 2022

Related U.S. Application Data

(60) Provisional application No. 63/126,548, filed on Dec. 17, 2020.

(51) Int. Cl.
*G06F 9/48* (2006.01)
*G06N 20/00* (2019.01)

(52) U.S. Cl.
CPC .......... *G06F 9/4812* (2013.01); *G06N 20/00* (2019.01)

(58) Field of Classification Search
CPC ....... G06F 9/4812; G06F 8/433; G06N 20/00; G06N 3/045; G06N 3/063
See application file for complete search history.

(56) References Cited

U.S. PATENT DOCUMENTS

| | | | | |
|---|---|---|---|---|
| 6,378,066 B1* | 4/2002 | Lewis | ................... | G06F 9/4494 712/217 |
| 6,745,384 B1* | 6/2004 | Biggerstaff | ........... | G06F 8/4441 717/136 |
| 7,668,979 B1* | 2/2010 | Wentzlaff | ............ | G06F 13/4022 710/33 |
| 2003/0204707 A1* | 10/2003 | Liang | .................... | G06F 9/3806 717/128 |
| 2014/0086446 A1* | 3/2014 | Han | ...................... | H04N 9/8211 382/100 |
| 2018/0267807 A1* | 9/2018 | Burger | ................... | G06F 9/4812 |
| 2019/0044878 A1* | 2/2019 | Steffen | .................... | H04L 47/34 |
| 2019/0324888 A1* | 10/2019 | Evans | ................. | G06F 11/0772 |
| 2019/0347125 A1* | 11/2019 | Sankaran | ............ | G06F 9/30189 |
| 2019/0377580 A1* | 12/2019 | Vorbach | .............. | G06F 9/30105 |
| 2020/0089503 A1* | 3/2020 | Gupta | ................... | G06F 15/825 |

* cited by examiner

*Primary Examiner* — Faisal M Zaman

(57) ABSTRACT

Techniques for data manipulation using processor graph execution using interrupt conservation are disclosed. Processing elements are configured to implement a data flow graph. The processing elements comprise a multilayer graph execution engine. A data engine is loaded with computational parameters for the multilayer graph execution engine. The data engine is coupled to the multilayer graph execution engine, and the computational parameters supply layer-by-layer execution data to the multilayer graph execution engine for data flow graph execution. A first command FIFO is used for loading the data engine with computational parameters, and a second command FIFO is used for loading the multilayer graph execution engine with layer definition data. An input image is provided for a first layer of the multilayer graph execution engine. The data flow graph is executed using the input image and the computational parameters. The executing is controlled by interrupts only when an uncertainty exists within the data flow graph.

23 Claims, 9 Drawing Sheets

```
setup 1st work-request;
while (1) {
    setup next work-request;
    wait-for-interrupt-from-MME; # previous work-item
}
```
600

```
Prefetch(1st-A);
Prefetch(1st-B);
Prefetch(1st-C);
wait-for-prefetch-interrupts(3);
setup 1st work-request;
# no wait-for-interrupt to setup command FIFO in MME
Prefetch(dummy-D); # small dummy store to simplify while(1) loop
while (1) {
    Prefetch(next-A);
    Prefetch(next-B);
    Prefetch(next-C);
    wait-for-prefetch-interrupts(4);
    setup work-request;
    wait-for-interrupt-from-MME; # previous work-item
    Prefetch(D); # store-this-result
}
```
602

*FIG. 6*

PROCESSOR GRAPH EXECUTION USING INTERRUPT CONSERVATION

PRIORITY CLAIM

This application claims the benefit of U.S. provisional patent application 63/126,548, filed on Dec. 17, 2020. The foregoing application is hereby incorporated by reference in its entirety.

FIELD OF ART

This application relates generally to data manipulation and more particularly to processor graph execution using interrupt conservation.

BACKGROUND

The collection of data by organizations, enterprises, and others, is remarkably widespread. The data, which includes personal and other data, is often collected without the knowledge or consent of individuals. The data is collected while the individuals are using their devices, irrespective of where the individuals are located. The data is collected while people are engaging with others in public spaces or while they are interacting with their electronic devices. And now with increasing frequency, the information is collected even while people are within their homes. An individual may be using her smartphone to track stock or commodities prices, while another person is using his tablet to access energy conservation content. Metadata related to personal device usage is collected irrespective of the user's interaction with the device. The data and metadata include websites visited; menu items selected and radio buttons clicked; and products and services searched, viewed, or purchased. The collected data is analyzed for purposes including monetization. The analysis results are used to push media content, products, or services that have the highest match to predicted user interests.

The rate of collection of personal and other data is rapidly accelerating due to emerging software analysis techniques and processor architectures. Government officials, businesspeople, and researchers aggregate and analyze the collected data datasets. The datasets or "big data" are immense, and far exceed the capabilities of traditional processors and analysis techniques, rendering the analysis economically infeasible. Further data handling requirements include the access, capture, maintenance, storage, transmission, and visualization of the data. Any one of these tasks quickly overwhelms the capacities of the traditional systems. Stakeholders would find little or no value to the data without viable and scalable data analysis and handling techniques. Innovative hardware and software techniques for data handling are required. Dataset owners or users are motivated to analyze the data, based on their economic and intellectual interests. Examples of data analysis applications include business analysis; disease or infection detection, tracking, and control; crime detection and prevention; meteorology; and complex scientific and engineering simulations; among many others. Advanced data analysis techniques now find applications such as predictive analytics, which can be used to show consumers products that they want, frequently before the consumers even know that they want them. Further approaches include applying machine learning and deep learning techniques in support of the data analysis. Improved processors and learning techniques have expanded and benefited many computer science disciplines including machine learning and deep learning, image and audio analysis, and data processing. Machine learning can be performed on a network such as a neural network. The neural network "learns" by processing the big data datasets. The greater the quantity of data, and the higher the quality of the data that is processed, the better the outcome of the machine learning. The processors used to execute the machine learning techniques are designed to efficiently handle the flow of data. These processors, which are based on data flow architectures, process data when valid data becomes available.

Reconfigurable hardware can be used for computing architectures that are highly flexible and particularly well suited to processing large data sets, performing complex computations, and executing other computationally resource-intensive applications. Reconfigurable computing incorporates key features drawn from both hardware and software techniques. A reconfigurable computing architecture can be "recoded" (reprogrammed) to suit a processing need. The recoding adapts or configures the high-performance hardware architecture, much like recoding or rewriting software. A reconfigurable fabric hardware technique is directly applicable to reconfigurable computing. Reconfigurable fabrics may be arranged in topologies or configurations for the many applications that require high performance computing. Applications such as the processing of big data, digital signal processing (DSP), machine learning based on neural networks, matrix or tensor computations, vector operations, Boolean manipulations, and so on, can be implemented within a reconfigurable fabric. The reconfigurable fabric operates particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

There are many applications that require the processing of very large quantities of data such as unstructured data. The data, which is collected into large datasets often called "big data", is processed for artificial intelligence training and analysis, trend analysis, business analytics, machine learning (including deep learning), medical research, pandemic tracking, law enforcement, public safety, and so on. Traditional processors and processing techniques are woefully inadequate for the immense computational requirements of the data handling. Data analysis systems designers and engineers have tried to meet the processing requirements by building or purchasing faster processors, designing custom integrated circuits (chips), implementing application specific integrated circuits (ASICs), programming field programmable gate arrays (FPGAs), etc. These approaches are based on computer and chip architectures, such as Von Neumann architectures, which are focused on how control of the chip operations (control flow view) is performed. The control flow view is very difficult to scale up in order to handle larger datasets. Alternatively, the flow of data (data flow view) can be considered. In a data flow architecture, the execution of instructions, functions, subroutines, kernels, agents, apps, etc. is based on the presence or absence of valid data available to a processor. Thus, control is greatly simplified. This latter approach, that of a data flow architecture, is significantly better suited to the tasks of handling the large amounts of unstructured data that are processed as part of the machine learning and deep learning applications, among others. The data flow architecture obviates the need for centralized control of the processing since no system clocks or centralized control signals are required. Instead, the data flow circuits are essentially "self-timed", based on the availability of valid data. A data flow architecture can be implemented using a reconfigurable fabric.

Data manipulation is based on processor graph execution using interrupt conservation. A processor-implemented method for data manipulation is disclosed comprising: configuring a plurality of processing elements to implement a data flow graph, wherein the processing elements comprise a multilayer graph execution engine; loading a data engine with computational parameters for the multilayer graph execution engine, wherein the data engine is coupled to the multilayer graph execution engine, and wherein the computational parameters supply layer-by-layer execution data to the multilayer graph execution engine for data flow graph execution; providing an input image for a first layer of the multilayer graph execution engine; and executing the data flow graph using the input image and the computational parameters, wherein the executing is controlled by interrupts only when an uncertainty exists within the data flow graph. Some embodiments comprise loading the data engine with computational parameters using a first command FIFO, and loading the multilayer graph execution engine with layer definition data using a second command FIFO. With the FIFOs loaded with instructions, execution of the multilayered data flow graph can begin. Execution can be initiated based on an interrupt. In embodiments, the second command FIFO enables an interrupt generation control bit. Interrupt generation can also be based on the data flow graph. In embodiments, the interrupt generation control bit can be set based on graph topology of the data flow graph implemented on the multilayer graph execution engine. In order to conserve interrupts, and the computational resources required to process the interrupts, instructions that execute the data flow graph can be ordered. In embodiments, an order of commands in the first command FIFO and the second command FIFO determines execution order in the multilayer graph execution engine.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 6 illustrates matrix multiply engine (MME) driver code.

DETAILED DESCRIPTION

Figure 1:
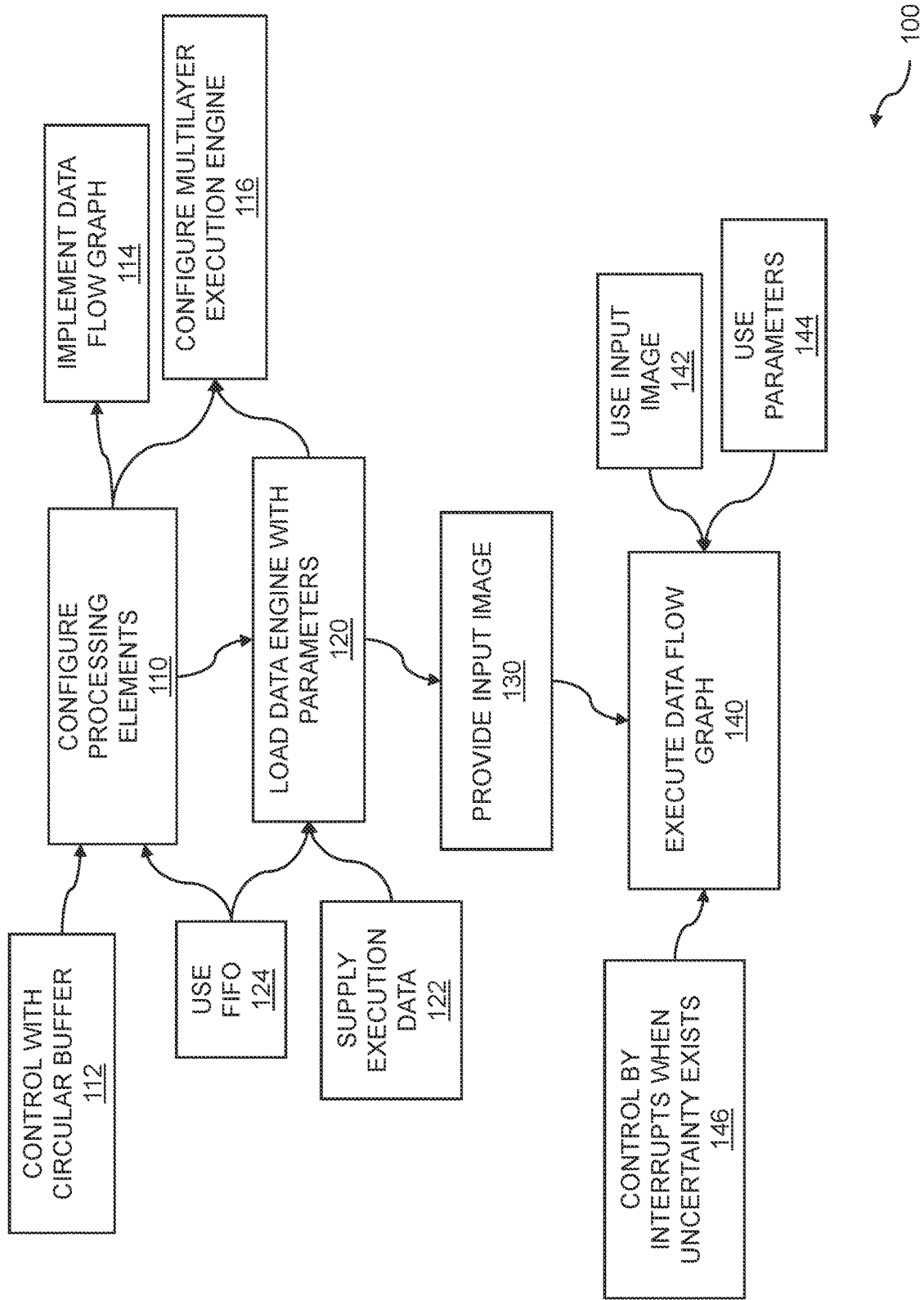
FIG. 1 is a flow diagram for processor graph execution using interrupt conservation.

Techniques for data manipulation based on processor graph execution using interrupt conservation are disclosed.

The data manipulation can be performed using processing elements that can be configured to implement a multilayer graph execution engine. The processor graph can include a data flow graph, where the data flow graph can be executed on the multilayer graph execution engine. The data flow graph, which comprises nodes for processing data and arcs for transferring data to, from, and among the nodes, can perform a wide range of data manipulation operations on various types of data. The data manipulation operations can include arithmetic operations, Boolean operations, matrix or tensor operations, and so on. The data can include integer data, real or floating-point data, vectors and matrices, tensors, and so on. A data engine is loaded with computational parameters for the multilayer graph execution engine. The computational parameters supply layer-by-layer execution data to the multilayer graph execution engine for data flow graph execution. The computational parameters can include configuration data, weights, biases, coefficients, etc. Data to be processed can be provided to the first layer of the multilayer graph execution engine. The data can include an input image, where the input image can include an image of a dataset, image data, audio data, medical data, research data, etc. The data flow can be executed using the input image and the computational parameters.

To simplify the providing of instructions, code, computational parameters, and so on, one or more first in first out (FIFO) registers can be coupled to the data engine and to the multilayer graph execution engine. In embodiments, a first command FIFO can be used to load the data engine with computational parameters, and a second command FIFO can be used to load the multilayer graph execution engine with layer definition data. The use of FIFOs provides significant advantages from a computational point of view. First, the loading of the FIFOs with computational parameters and layer definition data enables the data transfers for the loading to take place using a technique that removes data transfer dependencies. That is, data retrieved from storage can be loaded into a FIFO as the data arrives. When all of the required data has been loaded, where the data comprises the computational parameters of the layer definition data, then the loaded data can be provided to the associated engine. This technique simplifies timing requirements for the data loading. Second, the order of execution of the nodes or layers of the data flow graph can be controlled by the ordering of commands loaded into the FIFOs. In a data flow graph, an order of execution of the nodes or layers of the graph is critical to proper processing of the data manipulated by the graph. By ordering the commands in the first FIFO and the second FIFO, the execution order of the nodes or layers of the multilayer graph can be controlled. By ordering the commands to control the execution order, interrupts can be conserved. Instead of having to issue a task "complete," "data ready," "begin execution," or some other similar interrupt for every node in the data flow graph, the ordered instructions ensure that the nodes are executed in the proper order.

An engine, such as a data engine or a multilayer graph execution engine, can include one or more processors. A processor can include a central processing unit (CPU) or graphics processing unit (GPU), programmable logic, application-specific integrated circuits (ASICs), arithmetic processors, and the like. The processor can include clusters of elements within a reconfigurable computing environment. An engine can access various types of storage to obtain data, instructions, parameters, configuration data, etc. The storage can include small, fast memory and large, slow memory. The memory can include DMA memory, high performance memory, one or more high speed buffers, etc. While the disclosed techniques can describe interrupt conservation, the techniques can further be applied to processing tasks that operate on data by applying functions, algorithms, heuristics, apps, etc. The processing of data for data manipulation can be used to process large datasets. The large amounts of data, or "big data", saturate conventional, control-based computer hardware techniques such as Von Neumann techniques. The tasks, functions, algorithms, heuristics, and so on, can be described using data flow graphs, agents, Petri Nets, networks, and so on. The data flow graphs, agents, networks, etc. can be decomposed or partitioned into smaller operations such as kernels. The kernels can be allocated to processors such as CPUs or GPS, or to elements of the reconfigurable fabric. The allocating of elements within the reconfigurable fabric can include single processing elements, clusters of processing elements, a plurality of clusters of processing elements, co-processors, etc. The reconfigurable fabric includes elements that can be configured as processing elements, switching elements, storage elements, and so on. The configuring of the elements within the reconfigurable fabric, and the operation of the configured elements, can be controlled by rotating circular buffers. The rotating circular buffers can be coded, programmed, or "scheduled" to control the elements of the reconfigurable array. The rotating circular buffers can be statically scheduled. The rotating circular buffers can be dynamically updated, where the updating can be based on machine learning. The reconfigurable fabric supports data transfer, communications, and so on. The reconfigurable fabric further includes ports such as input ports, output ports, and input/output (bidirectional) ports, etc., which can be used to transfer data both into and out of the reconfigurable fabric.

In a reconfigurable fabric, mesh network, distributed network, or other suitable processing topology, the multiple processing elements (PEs) obtain data, process the data, store data, transfer data to other processing elements, and so on. The processing that is performed can be based on kernels, agents, functions, apps, etc., which include sets of instructions that are allocated to a single PE, a cluster of PEs, a plurality of clusters of PEs, etc. The instructions can be stored in one or more FIFOs. The clusters of PEs can be distributed across the reconfigurable fabric. In order for processing of the data to be performed effectively and efficiently, the data must be routed from input ports of the reconfigurable fabric, through the reconfigurable fabric, to the clusters of PEs that require the data. A data engine and a multilayer graph execution engine can access a set of hardware elements for processing and executing a data flow graph. The hardware elements can process various types of data, such as unstructured data, elements of a matrix or array, elements of a tensor, and so on. The data engine can be loaded with computational parameters for the multilayer graph execution engine. The loading can be accomplished by reading data from local storage, remote storage, and so on. The data can be obtained using DMA techniques.

Processor graph execution using interrupt conservation enables data manipulation. A plurality of processing elements is configured to implement a data flow graph. The processing elements can include clusters of processing elements allocated within a reconfigurable fabric. The elements of the reconfigurable fabric can include processing elements, storage elements, or switching elements. The processing elements comprise a multilayer graph execution engine. A data engine is loaded with computational parameters for the multilayer graph execution engine. The computational parameters can include weights, biases, coefficients, configuration data, etc. The computational parameters supply layer-by-layer execution data to the multilayer graph execution engine for data flow graph execution. An input image is provided for a first layer of the multilayer graph execution engine. The input image can include a variety of types of data such as unstructured data, image data, etc. The data flow graph is executed using the input image and the computational parameters. The execution can be initiated by an interrupt, where the interrupt can be based on completing of the input image, providing the input image and the computational parameters, etc. Other interrupts are conserved by ordering commands to determine execution order in the multilayer graph execution engine.

FIG. 1 is a flow diagram for processor graph execution using interrupt conservation. A processor graph, such as a data flow graph, a directed acyclic graph (DAG), and so on, can be executed using one or more processing elements. The processing elements can be used singly or can be organized into clusters with other processing elements. Clusters of processing elements can be used to process a variety of tasks, subtasks, and so on, associated with the processor graph. The processing elements can be configured into a variety of architectures, structures, graph engines, and so on, such as multilayer graph execution engine. An input image is provided for processing by the multilayer graph execution engine. The input image can include a dataset, an image of a dataset, a specific type of data such as image data, audio data, etc. The data flow graph is executed using the input image data and the computational parameters. Processing can be initiated by an interrupt while further interrupts can be conserved. The interrupts are conserved by controlling execution order in the multilayer graph execution engine by ordering commands in FIFOs associated with the data engine and the multilayer graph execution engine.

The flow 100 includes configuring 110 a plurality of processing elements. The processing elements can include one or more processors such as central processing units (CPUs), graphics processing units (GPUs), arithmetic processors, multiplication processors such as matrix multiplication processors, reconfigurable processors such as array or parallel processors, reconfigurable integrated circuits or chips such as field programmable gate arrays (FPGAs), application-specific integrated circuits (ASICs), and so on. In embodiments, the one or more processor clusters can be spread across a plurality of physical semiconductor chips. The processors can be accessed within other reconfigurable hardware. The processing elements can access storage or a memory comprising various types of memory. The memory can include small fast memory, large slow memory, and the like. The memory can include a DMA memory, a remote DMA (RDMA) memory, a high-performance memory (HPM), etc. In embodiments, the one or more processor clusters are accessed as part of processor clusters within a reconfigurable fabric. The processing elements within the reconfigurable fabric can be configured individually or can be organized in clusters. The reconfigurable fabric can include further elements such as storage elements, communications elements, and so on. In embodiments, the further elements can include one or more matrix multiply elements (MMEs). In the flow 100, each processing element is controlled 112 by one or more circular buffers. A code, program, app, or schedule can be loaded into the one or more circular buffers. In embodiments, the one or more circular buffers are statically scheduled. The static schedule can be loaded as part of configuring the processing elements. Based on machine learning (discussed shortly below), the one or more circular buffers can be dynamically updated.

In the flow 100, the configuring implements 114 a data flow graph. The data flow graph can include arcs and nodes, where the arcs represent the flow of data, and the nodes represent operations that can be performed on the data. A data flow graph can represent one or more data dependencies between or among various operations. The data dependencies can direct an order of the operations. In a usage example, a first operation A processes input data to generate intermediate data. A second operation B processes the intermediate data to generate output data. A data flow graph which includes processes A and B shows that the data provided to operation B depends on the completion of operation A. The operations can include arithmetic operations, Boolean operations, integer or real operations, matrix operations, tensor operations, and the like. The operations that can be performed by the data flow graph can include data manipulations such as image processing, signal processing, big data processing, and so on. In embodiments, the data flow graph implements machine learning. The machine learning can be used to adapt one or more capabilities of the processing elements based on data processed by the processing elements. The adapting can increase accuracy, improve convergence of the computations, and the like. The machine learning can be implemented using various techniques. In embodiments the machine learning comprises one or more neural networks. The one or more neural networks can be based on a variety of techniques. In embodiments, the neural network comprises a convolutional neural network. Other types of neural networks can also be used. The one or more processor clusters comprise elements that can be configured. In embodiments, each cluster of the one or more processor clusters within the reconfigurable fabric comprises processing elements, switching elements, or storage elements. In the flow 100, the processing elements comprise a multilayer graph execution engine 116. The data flow graph discussed previously can include an input node or layer, intermediate layers, one or more outputs, and so on. The multilayer graph execution engine configuration can include storage for weights, biases, parameters, coefficients, and so on. The configuration can further include the configured processors or clusters of processors, and configured interconnections or communications between or among the processors to handle data dependencies. Communication techniques can include switching elements within the reconfigurable fabric, network-on-chip (NOC) techniques, processor bus techniques, etc. In further embodiments, one or more layers of the multilayer graph execution engine can be configured to perform a matrix multiplication operation. The matrix multiplication operation can be used for a variety of applications including image processing, audio processing, etc. In embodiments, the matrix multiplication operation can enable neural network functionality. The neural network can be used for artificial intelligence (AI) processing, deep learning, and the like. Various implementations of neural networks can be enabled. In embodiments, the matrix multiplication operation can be part of a convolutional neural network layer.

The flow 100 includes loading a data engine with computational parameters 120 for the multilayer graph execution engine, where the data engine is coupled to the multilayer graph execution engine. The computational parameters can be uploaded by a user, downloaded from a library, obtained from a library, and so on. The computational parameters can be coded or programmed by a user, generated by software such as a compiler, etc. In embodiments, the computational parameters for loading the data engine are determined by a processor distinct from the processing elements. Noted above, the data engine is coupled to the multilayer graph execution engine. In embodiments, the data engine can be coupled to the multilayer graph execution engine using a high-speed buffer. The loading can be performed by accessing the computational parameters in local storage such as one or more storage elements within the reconfigurable fabric. The storage can further include storage coupled to the reconfigurable fabric, storage distributed among or shared by processors, remote storage, etc. The computational parameters can be used to configure the multilayer graph execution engine 116. The loading the computational parameters can include loading some or all of the parameters. In embodiments, the loading the data engine can be performed on a per layer basis for each layer of the multilayer graph execution engine. In the flow 100, the computational parameters 122 supply layer-by-layer execution data to the multilayer graph execution engine for data flow graph execution.

Discussed below, the execution of a layer of the data flow graph can in some cases occur while further computational parameters are loaded into the data engine. Such executing a layer of the data flow graph while loading parameters can parallelize operations associated with the data flow graph. Further embodiments in the flow 100 include loading the data engine with computational parameters using a first command FIFO 124. The FIFO can be used to order instructions to be executed by the data engine which can conserve interrupts. The use of a FIFO can enable the configuring of processing elements 110. Other embodiments include loading the multilayer graph execution engine with layer definition data using a second command FIFO. The first FIFO and the second FIFO can include FIFOs of substantially similar or substantially dissimilar sizes with respect to word width, number of words, etc. The flow 100 includes providing an input image 130 for a first layer of the multilayer graph execution engine. The input image can include one or more types of data. The data types can include integer or real, character, image, audio, medical, research, business, and so on. The data can include various bit widths, precisions, ranges, etc. The data can include an image of data within a dataset, where the dataset can include a big data dataset.

The flow 100 includes executing 140 the data flow graph. The executing the data flow graph can include executing instructions associated with a layer of the data flow graph. The flow 100 includes using the input image 142 to control the executing. The controlling of the executing can be based on the presence of the input image to enable execution, or the absence of the input image to prevent execution. The flow 100 further includes using the computational parameters to control the executing. The control, based on the computational parameters, can be enabled or prevented based on the presence or absence of the parameters. The control is further based on the computational parameters being used to configure the multilayer graph execution engine. With the processing elements configured for a multilayer graph execution engine, the computational parameters loaded, and the input image provided, then the data flow graph can be executed. The execution of the data flow graph can be commenced based on receiving an interrupt. In embodiments, the second command FIFO enables an interrupt generation control bit. Recall that the second FIFO contains the layer definitions. With a layer such as the first layer defined, and the input image provided, the interrupt generation control bit can be enabled, and execution of the first layer can begin. In other embodiments, the interrupt generation control bit is set based on graph topology of the data flow graph implemented on the multilayer graph execution engine. The graph topology can be used to identify operations that can be performed in parallel, independent operations, operations dependent on prior operations, and the like. The order of execution of levels in a data flow graph is critical to the proper operation of the data flow graph. In embodiments, an order of commands in the first command FIFO and the second command FIFO can determine execution order in the multilayer graph execution engine.

Note that an interrupt can be generated to begin execution of the data flow graph, but other interrupts are not required except in the event of an uncertainty (described below). In traditional systems, interrupts can be generated to begin data manipulation by a node, to indicate completion by a node, to indicate data requested or data complete, etc. Since the instructions can be ordered in the FIFOs to control the order of execution of the data flow graph, intermediate interrupts are not required within the graph. Thus, interrupts are conserved and computational resources which would be otherwise required for interrupt handling are freed for other processing tasks. In the flow 100, the executing is controlled by interrupts 146 only when an uncertainty exists within the data flow graph. In embodiments, the uncertainty can result from starting graph execution before all data is loaded into the graph execution engine. Since the data to be processed is incomplete, the results cannot be guaranteed to be valid. In other embodiments, the uncertainty can result from a lack of explicit dependency notification. Recall that processing with the data flow graph is based on provide data to a node and routing results from the node to an output or one or more other nodes. If that routing is not explicated stated, then the data dependencies of one or more nodes are unknown. In embodiments, the lack of explicit dependency notification can be caused by an overlap of loading and execution of the graph execution engine. Such an overlap can result for timing issues, data latency issues, and the like. In embodiments, wherein the lack of explicit dependency notification can be caused by non-determinism of loads from memory. Non-determinism can result when addresses for accessing storage have not arrived or are not stable, data read latency, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
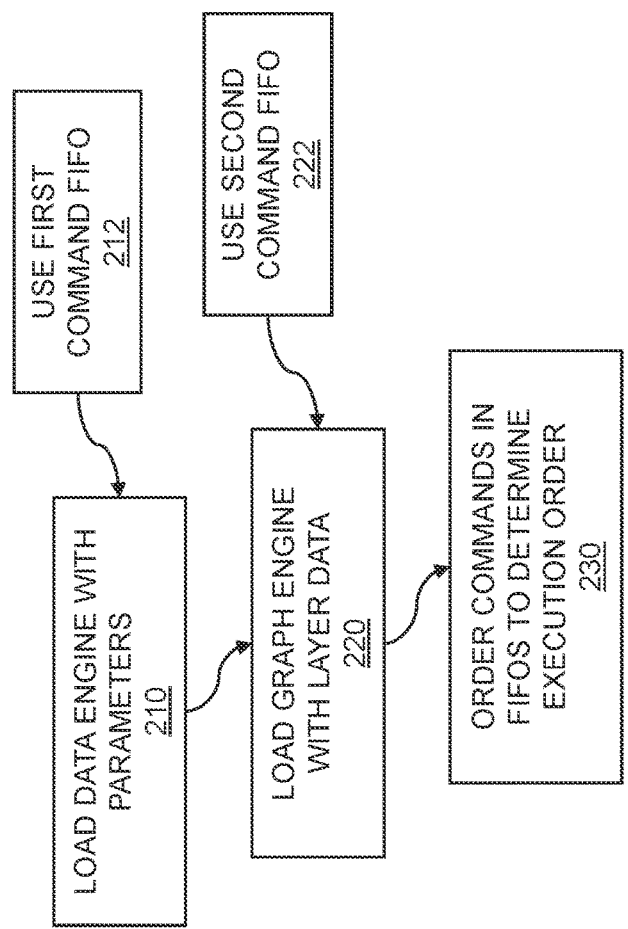
FIG. 2 is a flow diagram for FIFO usage.

FIG. 2 is a flow diagram for FIFO usage. Processor graph execution using interrupt conservation can be used for data manipulation. The need to generate an interrupt every time a process associated with a multilayered data flow graph initiates, completes, and so on, is averted by loading instructions into one or more FIFOs. The FIFOs can be associated with a data engine, a multilayer graph execution engine, and the like. The loading of instructions in such a way as to determine instruction execution order can preclude the need for further interrupts beyond an interrupt that can be used to initiate execution, thus resulting in interrupt conservation. Interrupts that are generated can be processed or "handled". The handling of the interrupts results in an efficient use of processor time which can be spent analyzing the interrupts and taking appropriate action based on the interrupts. Fewer interrupts require less processing and less processing time, thus enabling faster execution of the multilayered data flow graph. A plurality of processing elements is configured to implement a data flow graph, wherein the processing elements comprise a multilayer graph execution engine. A data engine is loaded with computational parameters for the multilayer graph execution engine, wherein the data engine is coupled to the multilayer graph execution engine, and wherein the computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

The flow 200 includes loading a data engine with computational parameters 210 for the multilayer graph execution engine. The computational parameters can be loaded from storage, where the storage can include local storage, external storage, remote storage, and so on. The computational parameters can be downloaded from a repository such as a library over a computer network such as the internet. The computational parameters can include weights, biases, coefficients, and so on, associated with layers of a multilayered data flow graph. The computational parameters can be uploaded by a user. The loading can be accomplished by transferring data, providing a pointer, etc. In embodiments, the transferring can be accomplished using techniques such as direct memory access (DMA) techniques. The DMA techniques can include using a DMA engine to generate addresses for accessing data in storage. In embodiments, the computational parameters can supply layer-by-layer execution data to a multilayer graph execution engine (discussed below). The multilayer graph execution engine can be used for data flow graph execution. In the flow 200, the loading the data engine uses a first command FIFO 212. The FIFO can be tightly coupled to the data engine. The FIFOs can be loaded with commands, instructions, and so on, that can be executed by the data engine. The instructions can include load operations, store operations, and the like. In embodiments, the loading the data engine can be performed on a per layer basis for each layer of the multilayer graph execution engine.

The flow 200 includes loading a multilayer graph execution engine 220 with layer definition data. The layer definition data can include configuration data which can be used for configuring a plurality of processing elements. Recall that the processing elements can include one or more of CPUs, GPUs, processor cores with integrated circuits, processor cores within programmable circuits such as FPGAs, or ASICs, and so on. In embodiments, the processor cores can include processor cores within a reconfigurable fabric. In the flow 200, the loading the multilayer graph execution engine includes using a second command FIFO 222. The second command FIFO can be tightly coupled to the multilayer graph execution engine. The loading the second FIFO can be based on transferring data, providing a pointer, providing an address, using a DMA technique, etc. Recall from discussions throughout that the computational parameters that are loaded into the data engine are used to provide layer-by-layer execution data to the multilayer graph execution engine. The layer-by-layer execution data can be used to process an input image that can be provided to the first layer of the multilayer graph execution engine. To start the processing of the input image, an interrupt can be generated.

In embodiments, the second command FIFO can enable an interrupt generation control bit. The interrupt generation control bit can be used to generate an interrupt where the interrupt can be used to initiate processing of the input image. In other embodiments, the interrupt generation control bit can be set based on graph topology of the data flow graph which is implemented on the multilayer graph execution engine. The graph topology can be based on a type of processing that can be performed based on the data flow graph. In embodiments, the data flow graph can implement machine learning. The machine learning can be based on one or more neural networks, where the neural networks can implement deep learning, a service vector machine, and the like. In embodiments, the executing the data flow graph can be controlled by an interrupt generated by completion of the providing an input image. The input image can include an image of a data set, image data, audio data, unstructured data, and so on. Processing of the input image cannot proceed until the input image is fully loaded. Once the input image is fully loaded, then the interrupt can be used to indicate that processing of the input data can proceed. In other embodiments, the executing the data flow graph can be controlled by an interrupt generated by completion of both the providing an input image for the first layer and the loading the first layer with corresponding first layer computational parameters.

In the flow 200, an order of commands in the first command FIFO and the second command FIFO determines execution order 230 in the multilayer graph execution engine. The ordering of commands can ensure that the layers of the multilayered data flow graph are executed in the correct order. The ordering commands further ensures that the data that flows from, to, and between or among layers is finalized data ready for processing, rather than incomplete, unfinished, partial, or otherwise inappropriate data. The ordering of commands has a further advantage in that interrupts are not required to indicate that a prior process has completed, that a dataset is ready for processing, and so on. Since the commands are ordered, the commands that process and generate data within one layer of the multilayered data flow graph complete execution prior to commencing execution of commands associated with a later layer within the multilayer graph. Thus, the ordering of commands controls data dependencies within the multilayered data flow graph. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
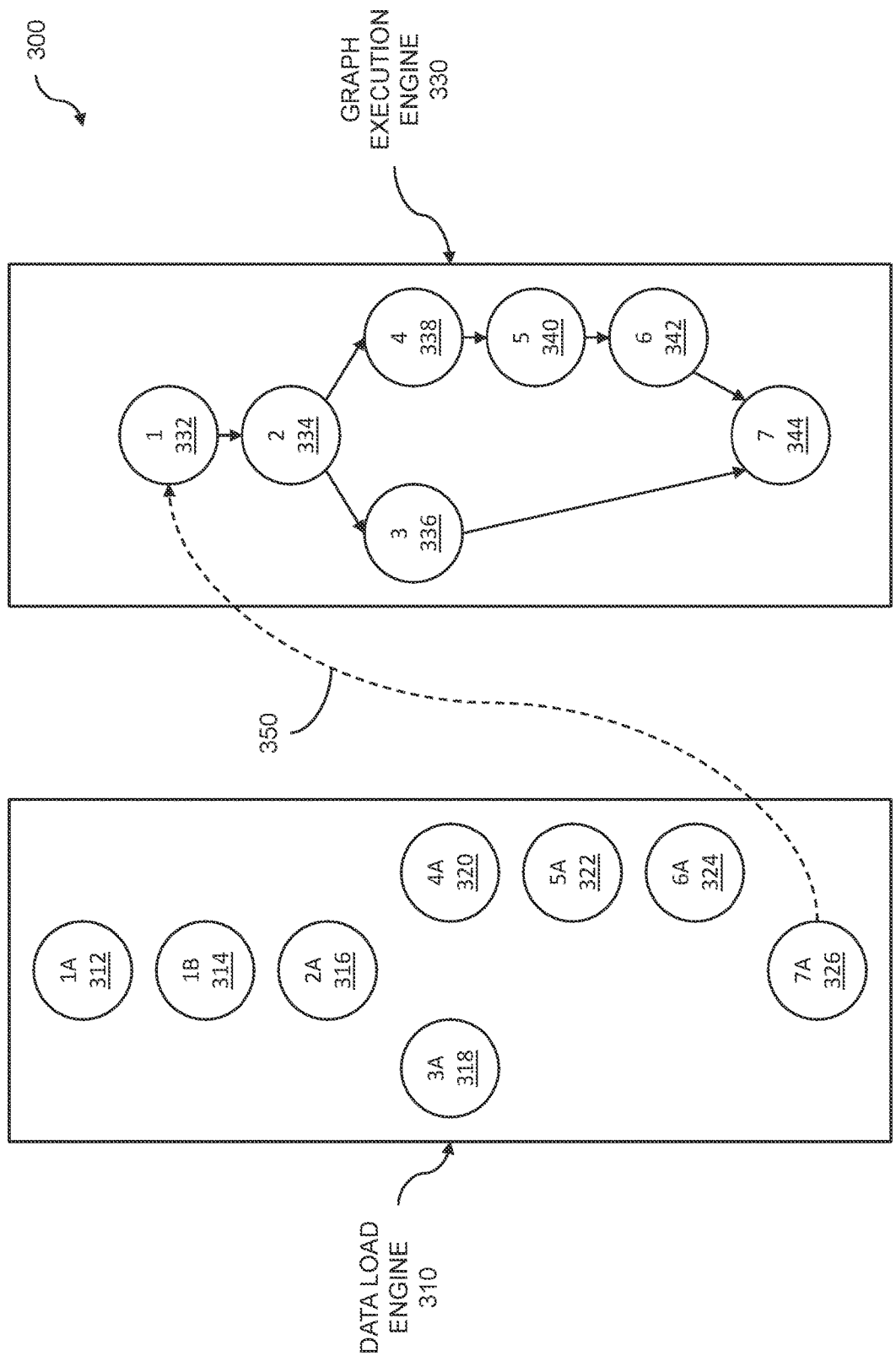
FIG. 3 shows loading a graph execution FIFO and demonstrates subsequent graph execution.

FIG. 3 shows loading a graph execution FIFO and demonstrates subsequent graph execution. A data load engine can be loaded with computational parameters prior to execution of a multilayer graph by a graph execution engine. Instructions, tasks, parameters, etc. that can be associated with the data load engine and the graph execution engine can be stored in one or more FIFOs coupled to the data load engine and the graph execution engine. Loading the graph execution FIFO and executing the multilayer graph by the graph execution engine enable processor graph execution using interrupt conservation. A plurality of processing elements is configured to implement a data flow graph, where the processing elements comprise a multilayer graph execution engine. A data engine is loaded with computational parameters for the multilayer graph execution engine, where the data engine is coupled to the multilayer graph execution engine, and where the computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

Loading of the graph execution FIFO and subsequent graph execution is shown 300. The data load engine 310 can be loaded with computational parameters, where the computational parameters can be for a multilayer graph execution engine. The layers within the multilayer graph can be represented by a number, and data associated with the layer can be represented by a letter. In the example 300, the first layer can include computational parameters 1A 312 and in input image 1B 314. The second layer can include computational parameters 2A 316. The third and fourth layers can be executed in parallel and can include computational parameters 3A 318 and computational parameters 4A 320. The fifth layer can include computational parameters 5A 322. The sixth layer can include computational parameters 6A 324. The seventh layer can include computational parameters 7A 326. While seven layers associated with the multilayer graph are shown, more layers or fewer layers can be included.

Described throughout, the computational parameters that can be loaded into the data load engine can supply layer-by-layer execution data to a multilayer graph execution engine 330. The multilayer graph execution engine 330 can include configured processing elements, where the configured processing elements can implement the layers of the data flow graph. The multilayer graph execution engine can include configured processors for each layer of the data flow graph. The configured processors can represent one or more nodes, where the one or more nodes can execute instructions, tasks, and so on, associated with the layers of the multilayer graph. In the example, the first layer node can include node 1 332. Node 1 can process the two tasks associated with the first layer of the graph, 1A and 1B. The second layer node can include node 2 334. The third layer node can include node 3 336. The fourth layer node can include node 4 338. The fifth layer node can include node 5 340. The sixth layer node can include node 6 342. The seventh layer node can include node 7 344.

In embodiments, the data load engine commands can be loaded into the data load engine prior to execution of the multilayer graph. In the example 300, execution of the first layer of the multilayer graph can begin subsequent to the loading of the computational parameters associated with 1A, 1B, 2A, 3A, 4A, 5A, 6A, and 7A. In embodiments, an interrupt generation control bit can be generated, where the interrupt generation control bit can be set based on graph topology of the data flow graph implemented on the multilayer graph execution engine. The interrupt generation control bit can cause an interrupt 350, where the interrupt 350 can initiate execution of the multilayer graph. Execution of the multilayer graph can begin with the first layer of the multilayer graph. Processing of the layers one through seven can be ordered based on an order of commands. In embodiments, an order of commands in a first command FIFO and a second command FIFO determines execution order in the multilayer graph execution engine. No interrupts that indicate completion of execution of an upstream layer prior to beginning execution of a downstream layer are required, thus conserving interrupts. Conservation of interrupts can improve processing efficiency since no interrupts require processing or handling.

Figure 4:
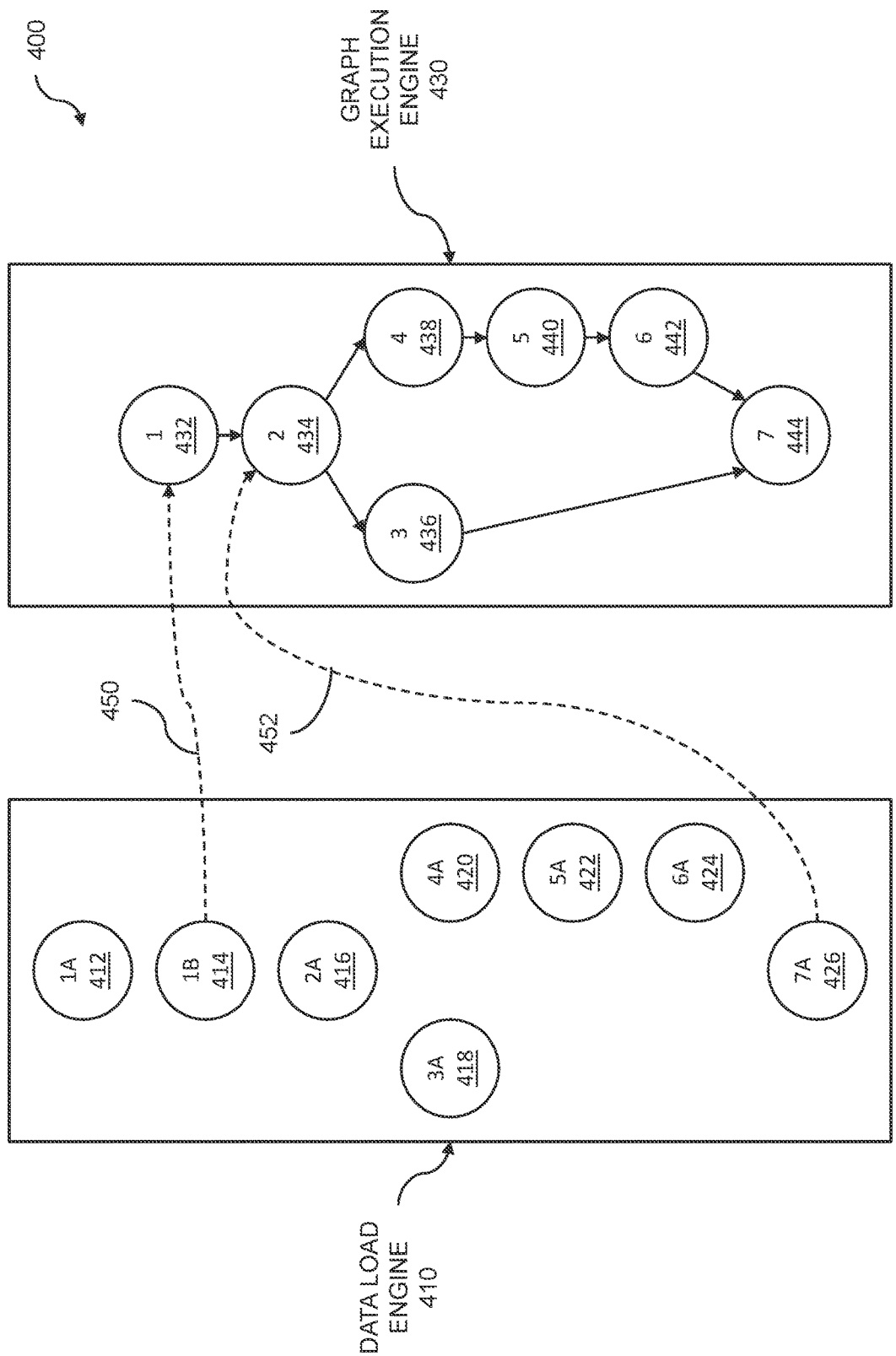
FIG. 4 illustrates loading a graph execution FIFO and shows parallel graph execution.

FIG. 4 illustrates loading graph execution FIFO and parallel graph execution. In the previous example of loading the graph execution FIFO, the data load engine was loaded with computational parameters prior to the graph execution engine executing the multilayer graph. In embodiments, an optimization which enables the loading of the data into the data load engine to occur in parallel with execution of the multilayer graph by the multilayer graph execution engine can be performed. Loading the graph execution FIFO and parallel execution of the multilayer graph enable processor graph execution using interrupt conservation. A plurality of processing elements is configured to implement a data flow graph, wherein the processing elements comprise a multilayer graph execution engine. A data engine is loaded with computational parameters for the multilayer graph execution engine. The computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

Loading of the graph execution FIFO and parallel graph execution is shown 400. The data load engine 410 can be loaded with computational parameters for a multilayer graph execution engine. The layers within the multilayer graph can be represented by a number, and inputs associated with the layer can be represented by a letter. In the example, layer one can include computational parameters for 1A 412 and in input image 1B 414. Layer two can include computational parameters 2A 416. Layers three and four can be executed in parallel and can include computational parameters 3A 418 and computational parameters 4A 420. Layer five can include computational parameters 5A 422. Layer six can include computational parameters 6A 424. Layer seven can include computational parameters 7A 426.

The computational parameters that can be loaded into the data load engine can supply layer-by-layer execution data to a multilayer graph execution engine 430. The multilayer graph execution engine 430 comprises configured processing elements, where the configured processing elements implement layers of the data flow graph. The multilayer graph execution engine can include configured processors for a first layer of the data flow graph. The configured processors can represent one or more nodes, where the one or more nodes can execute instructions, tasks, and so on, associated with the layers of the multilayer graph. In the example, the first layer node can include node 1 432. Node 1 can process the two tasks associated with the first layer of the graph. The second layer node can include node 2 434. The third layer node can include node 3 436. The fourth layer node can include node 4 438. The fifth layer node can include node 5 440. The sixth layer node can include node 6 442. The seventh layer node can include node 7 444.

The data load engine commands can be loaded into the data load engine prior to execution of the multilayer graph. In the example 400, execution of the first layer of the multilayer graph can begin subsequent to the loading of computational parameters 1A and input image 1B. In embodiments, an interrupt generation control bit can be generated, where the interrupt generation control bit can be set based on graph topology of the data flow graph implemented on the multilayer graph execution engine. The interrupt generation control bit can cause an interrupt 450, where the interrupt 450 can initiate execution of the first layer of the multilayer graph. Loading of computational parameters of further layers of the multilayer graph can occur while the execution of the first layer of the multilayer graph is occurring. When the computational parameters associated with the seventh layer of the graph have been loaded, then interrupt 452 can occur, and processing of the second layer of the multilayer graph can commence. Processing of the layers three through seven can be ordered based on an order of commands. In embodiments, an order of commands in a first command FIFO and a second command FIFO determines execution order in the multilayer graph execution engine. No interrupts that indicate completion of execution of a layer prior to beginning execution of another layer are required, thus conserving interrupts and improving processing efficiency since no interrupts that require processing or handling are generated.

Figure 5:
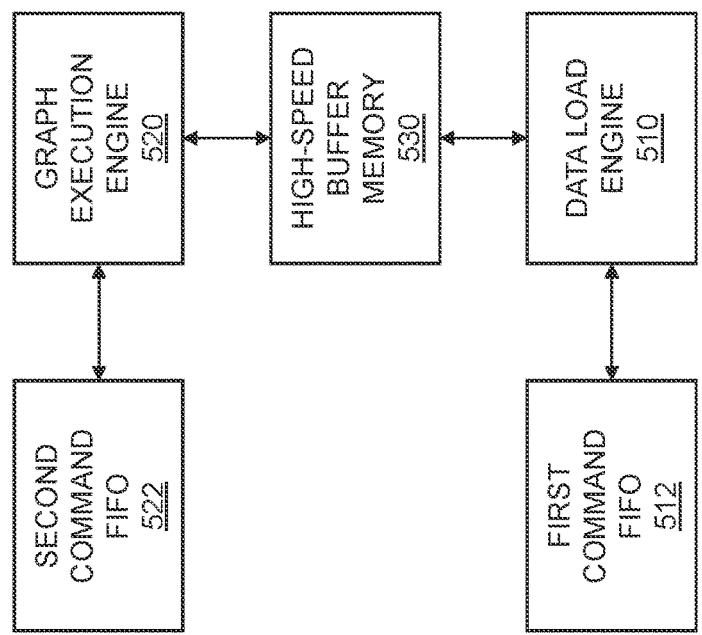
FIG. 5 is a system block diagram for FIFO loading.

FIG. 5 is a system block diagram for FIFO loading. A graph such as a data flow graph can be executed using processing elements that have been configured to implement the data flow graph. In order for the execution of the data flow graph to occur, instructions can be provided, where the instructions can be loaded in an execution order into one or more first in first out (FIFO) buffers. The instructions can be enqueued in the FIFO in the execution order, then dequeued as they are executed. Loading the one or more FIFOs enables processor graph execution using interrupt conservation. A plurality of processing elements is configured to implement a data flow graph, wherein the processing elements comprise a multilayer graph execution engine. A data engine is loaded with computational parameters for the multilayer graph execution engine, wherein the data engine is coupled to the multilayer graph execution engine, and wherein the computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

A system block diagram 500 for loading one or more FIFOs is shown. The system 500 can include a data load engine 510. The data load engine can be coupled to a multilayer graph execution engine (discussed shortly below). The graph execution engine can be used to execute a multilayer graph. Discussed throughout, the data load engine can be loaded with computational parameters. The computational parameters can be associated with the multi-layered graph execution engine. In embodiments, the computational parameters can supply layer-by-layer execution data to the multilayer graph execution engine for data flow graph execution. The computational parameters can include weights, biases, coefficients, and so on. The computational parameters can include instructions which when executed can perform operations associated with the layer-by-layer execution of the multilayer graph. Instructions associated with the data load engine can be enqueued into and dequeued from a first command FIFO 512. In embodiments, an order of commands in the first command FIFO can determine execution order in the multilayer graph execution engine. Since the order of the commands to be executed is set by the order in which the commands are loaded into the first FIFO, the interrupts are neither needed for commencing execution of each command nor for indication of completion of execution for each command.

The system 500 can include a graph execution engine 520. The graph execution engine, which can include a multilayer graph execution engine, can be configured from or within a plurality of processing elements. The processing elements can include CPUs, GPUs, processor cores within FPGAs or ASICs, and so on. In embodiments, the processing elements can include processing elements within a reconfigurable fabric. Instructions, codes, parameters, an input image, etc., can be executed by or processed by the graph execution engine. The instructions, codes, parameters, images, etc., can be loaded into a second command FIFO 522. The order in which the instructions, images, etc., are loaded into the second FIFO can determine the order in which the instructions are executed, or the data is processed by the graph execution engine. The system 500 can include a high-speed buffer memory 530. The high-speed buffer memory can provide a communication path between the data load engine and the graph execution engine. The high-speed buffer memory can provide shared storage to the data load engine and the graph execution engine.

FIG. 6 illustrates matrix multiply engine (MME) driver code. Discussed throughout, a matrix multiply engine or MME can be coupled to one or more processors for processor graph execution. The MME can be used to perform an operation associated with one or more layers of a multilayer graph execution engine. The operation of the MME can be controlled by instructions or code, where the instructions can be provided by a processor. The processor can include a processor from a plurality of processors. The MME enables processor graph execution using interrupt conservation. A plurality of processing elements is configured to implement a data flow graph. The processing elements comprise a multilayer graph execution engine. A data engine is loaded with computational parameters for the multilayer graph execution engine, wherein the data engine is coupled to the multilayer graph execution engine. The computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

An example starting point for matrix multiply engine driver code is shown, where the simple code is based on an infinite loop 600. In order to provide a starting point to execute a data flow graph, one or more instructions or work requests can be set up. The simple starting point example of code can be used to set up a work request, where a work request can be associated with a layer within a multilayer graph, a node within the multilayer graph, and so on. The work request remains in a pending state while waiting for a signal such as an interrupt to be received from the MME, where the interrupt can indicate that the MME is available for processing. Note that the one or more operations to be performed by the MME are dependent on prefetch tasks. The prefetch tasks can include loading instructions to be performed by the MME, ensuring that data required by the instructions is available for processing, and so on. In addition, storage of results of processing the data cannot be performed until after computations associated with the data have been completed. Thus, an ordering of commands can be required to ensure that loading, executing, and storage are performed in a proper order. In embodiments, an order of commands in a first command FIFO and a second command FIFO can determine execution order in the multilayer graph execution engine. An example of code including execution order is shown 602. Prefetching of data can be performed prior to setting up a series of instructions or a work request. The instructions or work request can be executed, and the results of the executing can be stored.

Figure 7:
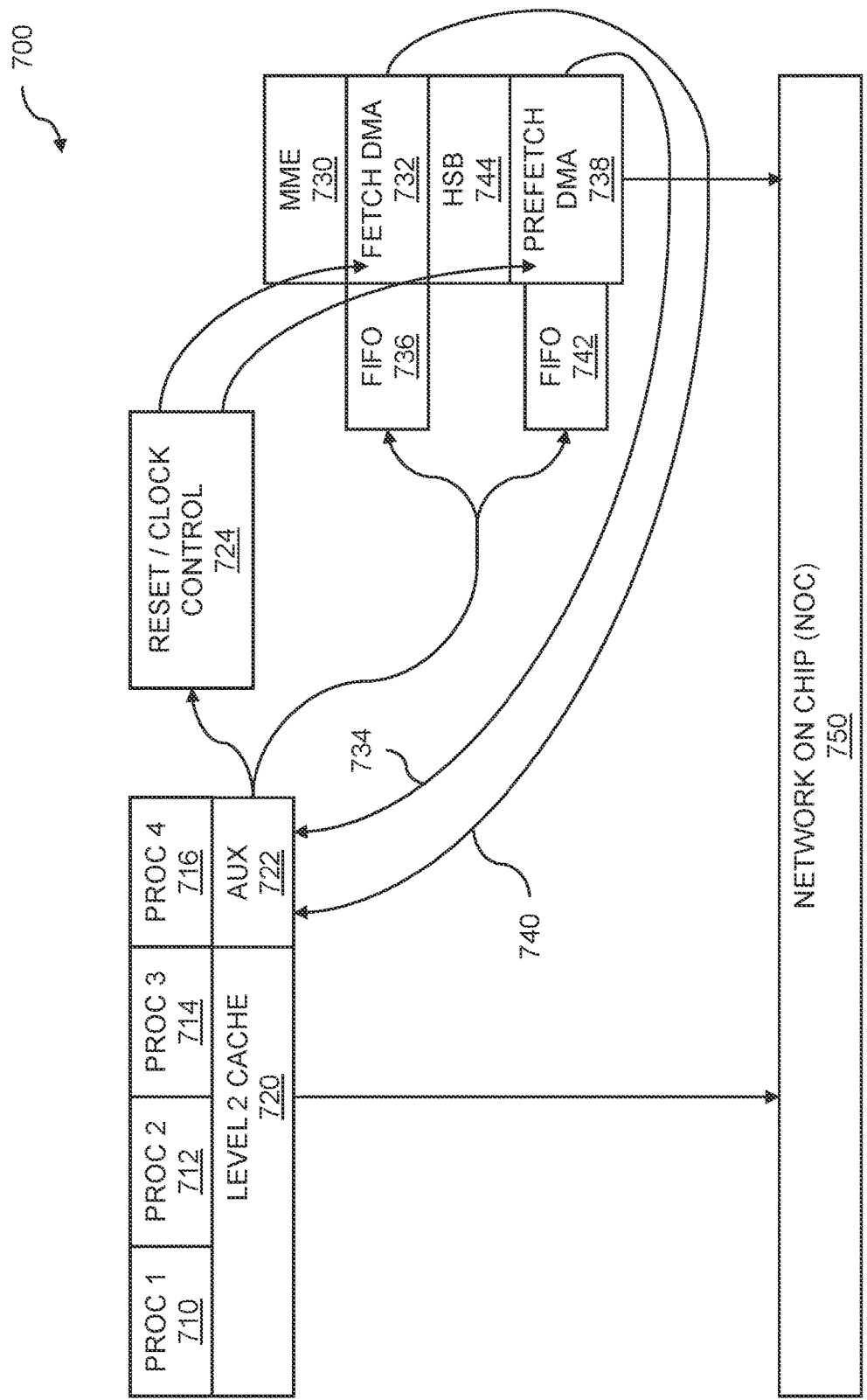
FIG. 7 shows a simplified system block diagram graph execution.

FIG. 7 shows a simplified system block diagram graph execution. A data flow graph can be executed based on loaded computational parameters and a provided input image. The data flow graph, which represents processes or tasks that operate on data and the flow of data to, from, and between or among processes, can include a directed acyclic graph (DAG), a Petri Net, and so on. The data flow graph execution can be accomplished using processing elements that are configured to implement the graph. A system for graph execution enables processor graph execution using interrupt conservation. A plurality of processing elements is configured to implement a data flow graph, wherein the processing elements comprise a multilayer graph execution engine. A data engine is loaded with computational parameters for the multilayer graph execution engine, wherein the data engine is coupled to the multilayer graph execution engine, and wherein the computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

A simplified system block diagram for data flow graph execution is shown. The system can be based on a matrix multiply engine (MME) that can be coupled to one or more processors. The MME can be based on an integer engine, a real or floating-point engine, and so on. In embodiments, the MME can include an 8-bit MME. The one or more processors to which the MME can be coupled can include CPUs, GPUs, processor cores with programmable chips such as FPGAs, processor cores within application-specific integrated circuits or chips (ASICs), and the like. The processors can be based on architectures such as RISC architectures, CISC architectures, etc. In embodiments, the processing elements can include processing elements within a reconfigurable fabric. The system block diagram 700 can include one or more processors such as processor proc 1 710, processor proc 2 712, processor proc 3 714, and processor proc 4 716. The processors can include CPUs, GPUs, processor cores within chips or a reconfigurable fabric, etc. The one or more processors can share a cache such as a level 2 cache 720. The level 2 cache can further be coupled to a network on a chip (NOC) 750 using a coherency manager. The connection to the NOC can be accomplished using an interface based on a management standard. In embodiments, the interface can be based on advanced extensible interface (AXI™) AXI coherency extensions (ACE™) standards. The NOC can enable communication between the L2 cache associated with the processors and other processing, network, and storage components, etc. In embodiments, the NOC enables communication between the L2 cache and a memory subsystem.

Auxiliary connections 722 that can be associated with the coherency manager can enable communications between the L2 cache and a reset and clock component 724. The reset and clock component 724 can comprise one or more registers where the registers can include memory mapped registers. The contents of the registers associated with the reset and clock component can be used to place a matrix multiply engine (MME) 730 in a reset state. The MME can be released from a reset state under software control. The reset and clock component can be used to reset the MME independently from other components within the system. The clock control can be used to provide one or more clock signals to the MME, to halt the MME, and so on. The operation of the MME can be based on instructions or "work requests". The instructions that can be operated on by the MME can be requested by a fetch component 732 where the fetch component can perform a direct memory access (DMA). The fetch component 732 can initiate an interrupt 740 to request instructions from the L2 cache 720. The L2 cache can provide instructions to a FIFO 736 associated with the fetch DMA 732. An additional DMA can be included, where the additional DMA includes a prefetch DMA 738. The prefetch DMA can generate an interrupt 740 to request instructions. The instructions can be provided to a FIFO 742 associated with the prefetch DMA. The prefetch DMA can be in further communication with the NOC 750. The NOC can enable communication between the prefetch DMA and a memory subsystem (not shown). The fetch DMA 732 and the prefetch DMA 738 can be coupled to a shared high-speed buffer (HSB) 744. The HSB can provide storage for instructions, data, intermediate results, and so on.

Figure 8:
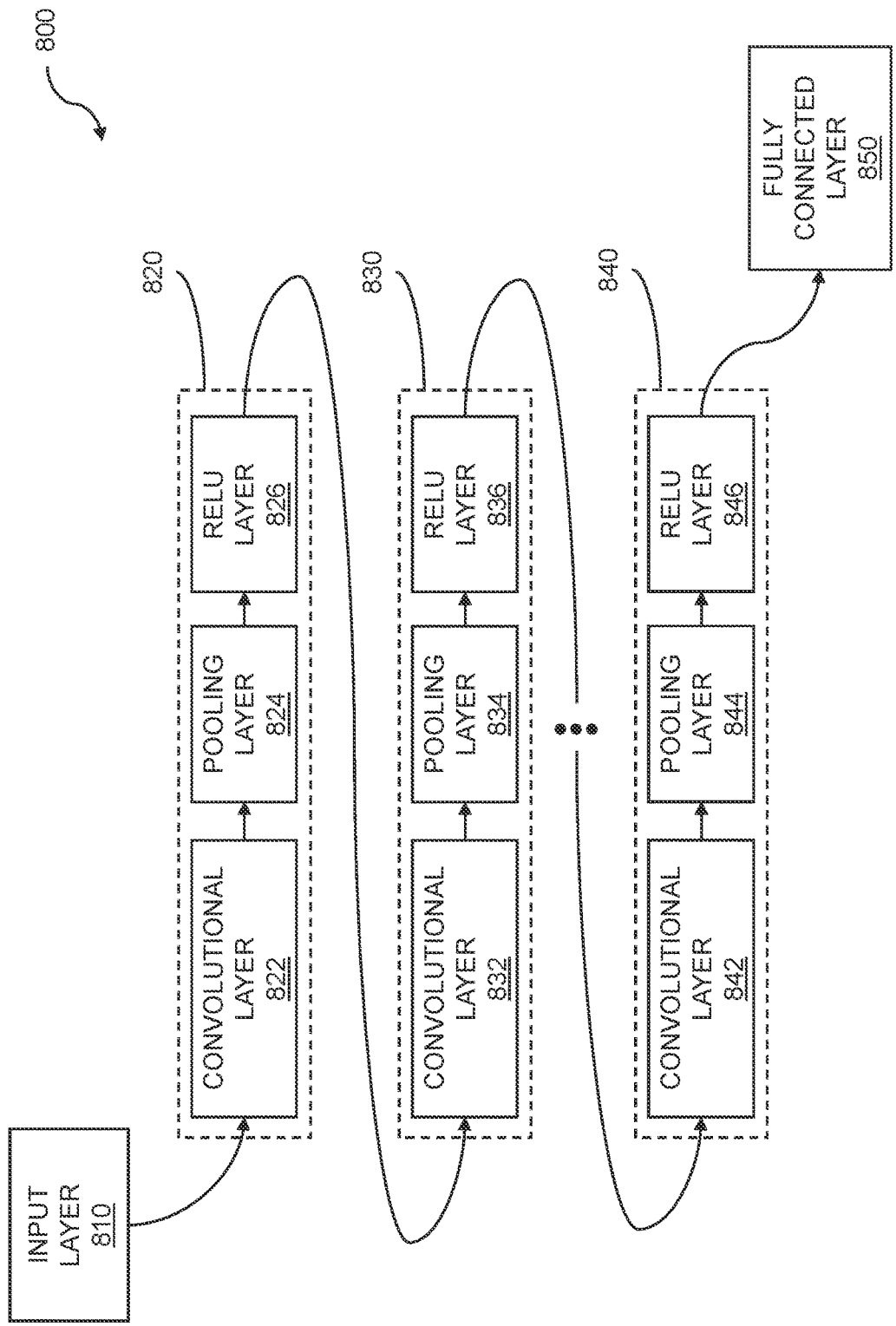
FIG. 8 illustrates a deep learning block diagram.

FIG. 8 illustrates a deep learning block diagram. The deep learning block diagram 800 can include a neural network such as a deep neural network (DNN), a convolutional neural network (CNN), a recurrent neural network (RNN), a deep learning network (DLN), and so on. A convolutional neural network or other neural network can be based on layers, where the layers can include input layers, output layers, fully connected layers, convolutional layers, pooling layers, max pooling layers, rectified linear unit (ReLU) layers, bottleneck layers, and so on. The layers can enable processor graph execution using interrupt conservation. A plurality of processing elements is configured to implement a data flow graph, wherein the processing elements comprise a multilayer graph execution engine. A data engine is loaded with computational parameters for the multilayer graph execution engine, wherein the data engine is coupled to the multilayer graph execution engine, and wherein the computational parameters supply layer-by-layer execution data to the multilayer graph execution engine for data flow graph execution. An input image is provided for a first layer of the multilayer graph execution engine. The data flow graph is executed using the input image and the computational parameters, wherein the executing is controlled by interrupts only when an uncertainty exists within the data flow graph.

The deep learning block diagram 800 can include various layers, where the layers can include an input layer, hidden layers, a fully connected layer, and so on. In some embodiments, the deep learning block diagram can include a classification layer. The input layer 810 can receive input data, where the input data can include a first obtained data group, a second obtained data group, a third obtained data group, a fourth obtained data group, etc. The obtaining of the data groups can be performed in a first locality, a second locality, a third locality, a fourth locality, and so on, respectively. The input layer can then perform processing such as partitioning obtained data into non-overlapping partitions. The deep learning block diagram 800, which can represent a network such as a convolutional neural network, can contain a plurality of hidden layers. While three hidden layers, hidden layer 820, hidden layer 830, and hidden layer 840 are shown, other numbers of hidden layers may be present. Each hidden layer can include layers that perform various operations, where the various layers can include a convolutional layer, a pooling layer, and a rectifier layer such as a rectified linear unit (ReLU) layer. Thus, layer 820 can include convolutional layer 822, pooling layer 824, and ReLU layer 826; layer 830 can include convolutional layer 832, pooling layer 834, and ReLU layer 836; and layer 840 can include convolutional layer 842, pooling layer 844, and ReLU layer 846. The convolutional layers 822, 832, and 842 can perform convolution operations; the pooling layers 824, 834, and 844 can perform pooling operations, including max pooling, such as data down-sampling; and the ReLU layers 826, 836, and 846 can perform rectification operations. A convolutional layer can reduce the amount of data feeding into a fully connected layer. The deep learning block diagram 800 can include a fully connected layer 850. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be located in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 9:
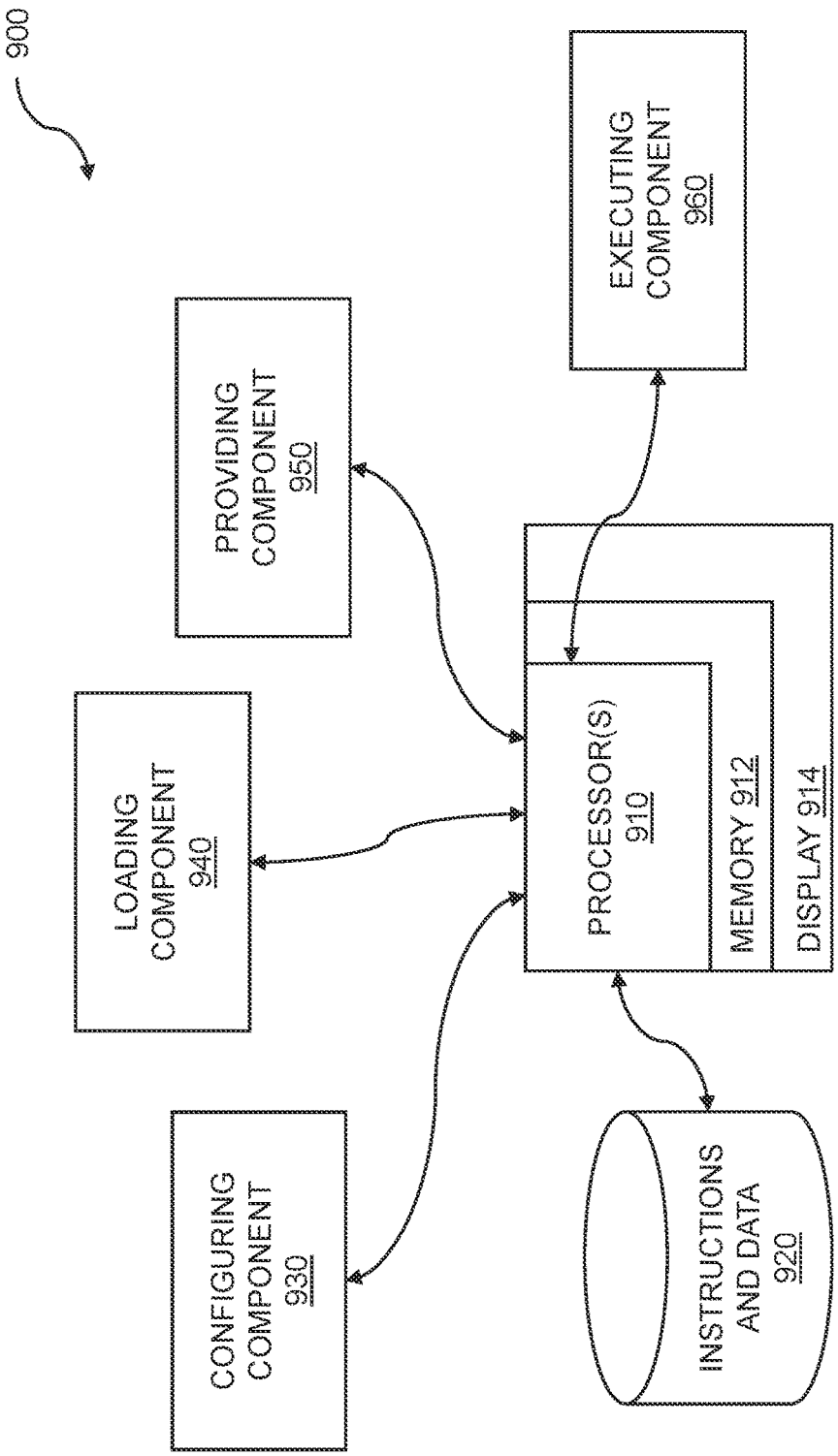
FIG. 9 is a system diagram for processor graph execution using interrupt conservation.

FIG. 9 is a system diagram for data manipulation. Data manipulation is based on processor graph execution using interrupt conservation. The system 900 can include one or more processors 910 attached to a memory 912 which stores instructions. The system 900 can include a display 914 coupled to the one or more processors 910 for displaying data, intermediate steps, instructions, tensors, and so on. The system 900 can include a computer system for data manipulation comprising: a memory which stores instructions; one or more processors coupled to the memory wherein the one or more processors, when executing the instructions which are stored, are configured to: configure a plurality of processing elements to implement a data flow graph, wherein the processing elements comprise a multilayer graph execution engine; load a data engine with computational parameters for the multilayer graph execution engine, wherein the data engine is coupled to the multilayer graph execution engine, and wherein the computational parameters supply layer-by-layer execution data to the multilayer graph execution engine for data flow graph execution; provide an input image for a first layer of the multilayer graph execution engine; and execute the data flow graph using the input image and the computational parameters, wherein the executing is controlled by interrupts only when an uncertainty exists within the data flow graph. The data engine is loaded with computational parameters using a first command FIFO. The computational parameters can include weights, biases, and so on, associated the data flow graph. Further, the multilayer graph execution engine is loaded with layer definition data using a second command FIFO. The layer definition data can be used to define the types of layers associated with the graph execution engine. The layers can include convolutional layers, bottleneck layers, input and output layers, etc. The second command FIFO can enable an interrupt generation control bit. The interrupt generation control bit can be used to commence executing the data flow graph. The processing elements can include individual processing elements or clusters of processing elements within a reconfigurable fabric, one or more CPUs or GPUs, reconfigurable hardware such as one or more FPGAs, one or more ASICs, grid processors, and so on. The multilayer graph execution engine is used execute the data flow graph which processes the input image. The input image can include image data, unstructured data, an image of data within a dataset, and so on. The order of execution in the multilayer graph execution engine is determined based on an order of commands in the first command FIFO and the second command FIFO. Thus, the need for interrupts is obviated except when an uncertainty exists. That is, once the execution of the data flow graph is initiated, interrupts are not needed to start one or more tasks or to indicate completion of the one or more tasks.

The system 900 can include a collection of instructions and data 920. The instructions and data 920 may be stored in storage such as electronic storage coupled to the one or more processors, a database, one or more statically linked libraries, one or more dynamically linked libraries, precompiled headers, source code, flow graphs, kernels, or other suitable formats. The instructions can include instructions for configuring processing elements to implement a data flow graph, instructions associated with executing the data flow graph, and so on. The data can include computational parameters for the multilayer graph execution engine, one or more input images, and the like. The instructions can include instructions for processing image data, where the processing is based on the computational parameters for the multilayer graph execution engine. In embodiments, the instructions that implement the data flow graph can implement a data flow graph that can implement machine learning. The instructions can control one or more neural networks. The execution of instructions, such as instructions for execution of data flow graphs, can be performed within a reconfigurable fabric. The instructions can include satisfiability solver techniques, machine learning or deep learning techniques, neural network techniques, agents, and the like. The instructions can include constraints, routing maps, or satisfiability models.

The system 900 can include a configuring component 930. The configuring component 930 can include functions and instructions for configuring a plurality of processing elements to implement a data flow graph, wherein the processing elements comprise a multilayer graph execution engine. Discussed below and throughout, computational parameters can supply layer-by-layer execution data to the multilayer graph execution engine. In embodiments, the processing elements can be part of a reconfigurable fabric. The reconfigurable fabric can include a variety of components including processing elements, storage elements, communications elements, control elements, etc. In embodiments, each processing element can be controlled by one or more circular buffers. The circular buffers can be loaded or "scheduled" with instructions which can control the processing elements. In embodiments, the one or more circular buffers can be statically scheduled. The configured layers of the multilayer graph execution engine can be used to perform a variety of operations such as arithmetic or Boolean operations; vector, array, or matrix operations; tensor operations; and so on. In embodiments, one or more layers of the multilayer graph execution engine can be configured to perform a matrix multiplication operation. One or more matrix multiplication operations can be applied to applications such as image or audio processing. In embodiments, the matrix multiplication operation can enable neural network functionality. The neural network functionality can include a convolutional neural network, a recurrent neural network, a deep learning or machine learning neural network, etc. In embodiments, the matrix multiplication operation can be part of a convolutional neural network layer.

The system 900 can include a loading component 940. The loading component 940 can include functions and instructions for loading a data engine with computational parameters for the multilayer graph execution engine, wherein the data engine is coupled to the multilayer graph execution engine, and wherein the computational parameters supply layer-by-layer execution data to the multilayer graph execution engine for data flow graph execution. The computational parameters can include weights, biases, and coefficients. The computational parameters can be loaded into registers or a register file, a cache, local storage, remote storage, and so on. Embodiments can include loading the data engine with computational parameters using a first command FIFO. As the name implies, a first in first out or FIFO enables that which is written in a certain order to be extracted in the same order. The layer-by-layer execution data can include configuration data, where the configuration data can be used to configure the plurality of processing elements into layers. The layers can represent computation operations such as arithmetic operations, Boolean operations, matrix operations, and so on. Further embodiments include loading the multilayer graph execution engine with layer definition data using a second command FIFO. The second command FIFO can be used to control operation of the multilayer graph execution engine, where operation can be initiated by an interrupt. In embodiments, the second command FIFO can enable an interrupt generation control bit. The interrupt generation control bit can be set based on the configuration of the plurality or processing elements. In embodiments, the interrupt generation control bit can be set based on graph topology of the data flow graph implemented on the multilayer graph execution engine. The graph topology can include a number of layers within the graph; communications paths to, from, and between nodes within the graph, etc.

The system 900 can include a providing component 950. The providing component 950 can include functions and instructions for providing an input image for a first layer of the multilayer graph execution engine. The image data can include a variety of types of data, where the data can include structured data, unstructured data, and so on. The image data can include an image of data within a dataset. The image data can include specific types of data such as data comprising audio information, data comprising image (e.g., picture) information, data comprising video, and the like.

The system 900 can include an executing component 960. The executing component 960 can include functions and instructions for executing the data flow graph using the input image and the computational parameters, wherein the executing is controlled by interrupts only when an uncertainty exists within the data flow graph. The executing can be based on using the layer-by-layer execution data and the data engine computation parameters to process the image data. Recall that a data flow graph includes node which process data, and arcs that provide data to, from, and between or among the nodes. The placement of the nodes within the data flow graph can indicate an order of operations, which operations are dependent operations, which operations are independent operations, etc. In embodiments, an order of commands in the first command FIFO and the second command FIFO can determine execution order in the multilayer graph execution engine. Alluded to previously, initiating execution of the data flow graph can be based on an interrupt. In embodiments, the executing the data flow graph can be controlled by an interrupt generated by completion of the providing an input image. That is, when the data is available for processing by the data flow graph, then execution of the data flow graph can be performed. In other embodiments, the executing the data flow graph can be controlled by an interrupt generated by completion of both the providing an input image for the first layer and loading the first layer with corresponding first layer computational parameters.

Stated previously and throughout, the executing can be controlled by interrupts only when an uncertainty exists. In the context of this example system, the uncertainty can result from starting graph execution before all data is loaded into the graph execution engine. Since the order of commands within the first command FIFO and the second command FIFO determine the execution order, then interrupts are not required to indicate that data is available to a node so that execution of the node can begin. Nor is an interrupt required to indicate that execution of the node has been completed. In other embodiments, the uncertainty can result from starting graph execution before all data is loaded into the graph execution engine. This latter uncertainty can result if an interrupt occurs when all data has been loaded. In further embodiments, the uncertainty can result from a lack of explicit dependency notification. The uncertainty results from missing dependencies between and among nodes within the multilayer graph execution engine. In embodiments, the lack of explicit dependency notification can be caused by an overlap of loading and execution of the graph execution engine. Since the computational parameters supply layer-by-layer execution data to the multilayer graph execution engine, incomplete loading of the computational dependencies would not ensure proper execution of the data flow graph. In embodiments, the lack of explicit dependency notification can be caused by non-determinism of loads from memory.

The system 900 can include a computer program product embodied in a non-transitory computer readable medium for data manipulation, the computer program product comprising code which causes one or more processors to perform operations of: configuring a plurality of processing elements to implement a data flow graph, wherein the processing elements comprise a multilayer graph execution engine; loading a data engine with computational parameters for the multilayer graph execution engine, wherein the data engine is coupled to the multilayer graph execution engine, and wherein the computational parameters supply layer-by-layer execution data to the multilayer graph execution engine for data flow graph execution; providing an input image for a first layer of the multilayer graph execution engine; and executing the data flow graph using the input image and the computational parameters, wherein the executing is controlled by interrupts only when an uncertainty exists within the data flow graph.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
    configuring a plurality of processing elements to implement a data flow graph, wherein the processing elements comprise a multilayer graph execution engine;
    loading a data engine with computational parameters for the multilayer graph execution engine using one or more first command FIFO registers, wherein an order of commands in the one or more first command FIFO registers corresponds to an order of flow in the data flow, and wherein the data engine is coupled to the multilayer graph execution engine, and wherein the computational parameters supply layer-by-layer execution data to the multilayer graph execution engine for data flow graph execution;
    providing an input image for a first layer of the multilayer graph execution engine; and
    executing the data flow graph using the input image and the computational parameters, wherein the executing is controlled by interrupts only when an uncertainty exists as to whether the order of commands in the one or more FIFO registers corresponds to the order of flow in the data flow graph.

2. The method of claim 1 further comprising loading the multilayer graph execution engine with layer definition data using a second command FIFO.

3. The method of claim 2 wherein the second command FIFO enables an interrupt generation control bit.

4. The method of claim 3 wherein the interrupt generation control bit is set based on graph topology of the data flow graph implemented on the multilayer graph execution engine.

5. The method of claim 2 wherein an order of commands in the first command FIFO and the second command FIFO determines execution order in the multilayer graph execution engine.

6. The method of claim 1 wherein the executing the data flow graph is controlled by an interrupt generated by completion of the providing an input image.

7. The method of claim 1 wherein the executing the data flow graph is controlled by an interrupt generated by completion of both the providing an input image for the first layer and loading the first layer with corresponding first layer computational parameters.

8. The method of claim 1 wherein the uncertainty results from starting graph execution before all data is loaded into the graph execution engine.

9. The method of claim 1 wherein the uncertainty results from a lack of explicit dependency notification.

10. The method of claim 9 wherein the lack of explicit dependency notification is caused by an overlap of loading and execution of the graph execution engine.

11. The method of claim 9 wherein the lack of explicit dependency notification is caused by non-determinism of loads from memory.

12. The method of claim 1 wherein the data engine is coupled to the multilayer graph execution engine using a high-speed buffer.

13. The method of claim 1 wherein the loading the data engine is performed on a per layer basis for each layer of the multilayer graph execution engine.

14. The method of claim 1 wherein one or more layers of the multilayer graph execution engine are configured to perform a matrix multiplication operation.

15. The method of claim 14 wherein the matrix multiplication operation enables neural network functionality.

16. The method of claim 14 wherein the matrix multiplication operation is part of a convolutional neural network layer.

17. The method of claim 1 wherein the computational parameters for loading the data engine are determined by a processor distinct from the processing elements.

18. The method of claim 1 wherein the processing elements are part of a reconfigurable fabric.

19. The method of claim 1 wherein each processing element is controlled by one or more circular buffers.

20. The method of claim 19 wherein the one or more circular buffers are statically scheduled.

21. The method of claim 1 wherein the data flow graph implements machine learning.

22. A computer program product embodied in a non-transitory computer readable medium for data manipulation, the computer program product comprising code which causes one or more processors to perform operations of:
    configuring a plurality of processing elements to implement a data flow graph, wherein the processing elements comprise a multilayer graph execution engine;
    loading a data engine with computational parameters for the multilayer graph execution engine using one or more first command FIFO registers, wherein an order of commands in the one or more first command FIFO registers corresponds to an order of flow in the data flow, and wherein the data engine is coupled to the multilayer graph execution engine, and wherein the computational parameters supply layer-by-layer execution data to the multilayer graph execution engine for data flow graph execution;
    providing an input image for a first layer of the multilayer graph execution engine; and
    executing the data flow graph using the input image and the computational parameters, wherein the executing is controlled by interrupts only when an uncertainty exists as to whether the order of commands in the one or more FIFO registers corresponds to the order of flow in the data flow graph.

23. A computer system for data manipulation comprising:
    a memory which stores instructions;
    one or more processors coupled to the memory wherein the one or more processors, when executing the instructions which are stored, are configured to:

configure a plurality of processing elements to implement a data flow graph, wherein the processing elements comprise a multilayer graph execution engine;

load a data engine with computational parameters for the multilayer graph execution engine using one or more first command FIFO registers, wherein an order of commands in the one or more first command FIFO registers corresponds to an order of flow in the data flow, and wherein the data engine is coupled to the multilayer graph execution engine, and wherein the computational parameters supply layer-by-layer execution data to the multilayer graph execution engine for data flow graph execution;

provide an input image for a first layer of the multilayer graph execution engine; and execute the data flow graph using the input image and the computational parameters, wherein the executing is controlled by interrupts only when an uncertainty exists as to whether the order of commands in the one or more FIFO registers corresponds to the order of flow in the data flow graph.

\* \* \* \* \*